SOLID STATE LASER

Filed March 23, 1966

INVENTORS J. F. DILLON, JR.
R. C. LE CRAW
BY George S. Indig
ATTORNEY 3,526,850

SOLID STATE LASER

Joseph F. Dillon, Jr., Morris Township, Morris County, and Roy C. Le Craw, Madison, N.J., assignors to Bell Telephone Laboratories, Incorporated, New York, N.Y., a corporation of New York Filed Mar. 23, 1966, Ser. No. 536,803
Int. Cl. H01s *3/05, 3/10, 3/16*
U.S. Cl. 331—94.5 1 Claim

ABSTRACT OF THE DISCLOSURE

A laser beam is modulated within a magnetic laser host by application of a saturating magnetic field having a component in a permitted beam direction. Modulation sensed by means of a polarization analyzer may be realized as a change in amplitude, phase or beam direction.

This invention relates to solid state laser devices in which the laser host has saturable magnetic properties and in which the nature of the laser beam is altered by means of an applied magnetic field.

The laser, first announced just a few years ago, has now found its way into a broad field of applications. It has been applied to delicate surgery, fabrication, and to Raman spectroscopy, to name a few uses.

As a new communications device, however, the laser's promise has not yet been fulfilled. It is indisputable that significant strides have been made in that direction, as by the development of parametric devices, as well as tuners and modulators based on interactions of the laser beam with magnetic and electric fields. It is possible that some one of these schemes may ultimately turn out to be commercially satisfactory for use in an optical communications system. It is possible, however, that other approaches may be more promising in certain applications.

In copending application Ser. No. 536,722, there is described an operating laser in a ferrimagnetic host. Realization of this possibility gives rise to a number of exciting devices in which the nature of the laser beam may be altered. A number of such arrangements are disclosed in the copending application.

In accordance with this invention, there is disclosed a novel class of such laser devices, all operating in saturable magnetic hosts either ferrimagnetic or ferromagnetic, in which the nature of the beam is somehow modified by an applied magnetic field. The devices within this class depend for their operation upon a direction of net magnetization which has components normal to and parallel to a permitted laser beam direction at some time during operation of the device and which may be changing relative to a crystallographic direction in the device during operation. For the purposes herein, an applied field must have a net magnetization direction which is at least 2° off normal or parallel relative to a laser beam direction or which is so arranged to change through an angle of at least 0.1° relative to a crystallographic direction in use.

Use of an applied field resulting in the noted magnetization in accordance with this disclosure may result in frequency or amplitude tuning, in deflection, or in spatial, amplitude or frequency modulation, as well as in Q-spoiling. While other arrangements are described, these objectives are conveniently accomplished by use of two generally orthogonal fields, and a preferred class of devices is so described.

A detailed description of the invention is expedited by reference to the drawing, in which.

Figure 1:
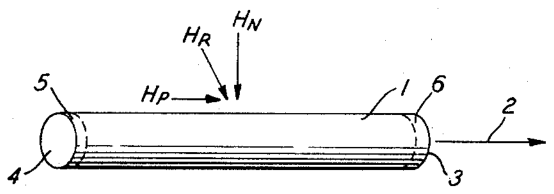
FIG. 1 is a schematic representation in perspective of a magnetic laser so arranged that its operation is influence by an impressed magnetic field.

Referring again to FIG. 1, laser 1, constructed of a saturable magnetic material, is capable of being energized by means not shown so as to result in laser beam 2 emerging from face 3. While the arrangement of FIG. 1 may take advantage of different phenomena or of a combination of phenomena, the mode discussed below takes advantage of the fact that the light beam 2 has at least a component of plane polarization either introduced by polarizer 5 and/or 6 or naturally occurring. While it is clear that an applied magnetic field may result in a circularly polarized beam, and while this can certainly be accomplished by proper selection of the field direction, a degree of plane polarization may also result in a magnetic host for the same reasons that it occurs in other solid state lasers.

A common reason for such plane or linear polarization is the relatively low symmetry of the active ion site in the crystal (trivalent rare earths in garnet structures are exemplary). This condition arises, too, from any anisotropy in the crystal as occurs even in a cubic crystal when the direction of beam traversal does not exactly coincide with a major axis, and may also result from gross effects as crystal defects, undulations in the ends, etc. Of course, the circular polarization of the light beam may also serve as the mechanism through which interaction with the magnetic field alters the character of the beam, and a device operating on this principle is described further on. For the purpose of this description, devices based on interaction through the plane polarized component are discussed as if the beam is purely plane polarized.

Ends 3 and 4 of crystalline body 1 are coated in such manner that 4 is a substantially complete reflector and 3 is a partial reflector as in the usual solid state laser oscillator structure.

Body 1 is magnetically saturated in a direction normal to beam 2 by applied magnetic field $H_N$. Since this field has no component parallel to beam 2, there is no rotational effect on the plane of polarization of the beam, and aside from effects discussed in the preceding paragraph, the device operates as it would in a nonmagnetic host. The nature of the emergent beam is now altered by tilting the net magnetization. This may be done by imposing a second field $H_P$, this time parallel to the beam, such field being of sufficient magnitude to result in a net direction of magnetization along resultant field $H_R$. Since this resultant field has a component parallel to the beam, the plane of polarization is rotated during traversal. Because this gyromagnetic rotation is nonreciprocal, the plane continues to rotate in the same direction through each successive traversal. At some position the accumulated degree of rotation is such that the E vector of the wave is sufficiently out of phase to prevent further stimulation by a pair of waves. The distance over which this influence is felt is dependent upon the degree of rotation, that is the magnitude of the magnetization component parallel to the beam, and on the extent to which the laser is operating above threshold. Operating conditions may conspire, for example, to prevent stimulation where the waves are out of phase by 150°, in which event the region over which stimulation is prevented with respect to this wave pair will extend from +150° to −150° with the respect to a specific wave. By changing the magnitude of the magnetization component parallel to the beam, the degree of rotation may be altered, so changing both the frequency and length of the regions over which the wave pairs destructively react, and in this manner the amplitude of the laser output may be varied.

While the naturally arising plane polarization may be sufficient for the purposes above noted, it may be desirable to bring it about artificially. Polarizing elements 5 and 6, indicated in dashed lines on FIG. 1, may serve this function. With the device operating as an oscillator and with the beam emerging at 2, as indicated, element 5, used alone, functioning as a reflecting polarizer may bring about the condition described and permit that operation. Accordingly, lasing action is quenched over any region with regard to two specific beams which are the requisite degree out of phase. Once the polarization has been introduced in this fashion, rotation is, of course, continuous and nonreciprocal, as discussed.

Element 6, which may serve alone or in combination with element 5, may, by itself, introduce that degree of polarization necessary to the described operation or may function as a transmission element or analyzer. In this manner, it may pass only beams having a component of polarization in the permitted transmission direction. Ninety-degree rotation at this final position completely prevents emission while intermediate degrees of rotation may pass varying amounts of energy. Use of element 6 in this manner lends itself to Q-spoiling, as well as certain other functions described.

While optional elements such as 5 and/or 6 are not specifically depicted in the other figures, such artificial means for introducing plane polarization may also be useful in such connection where naturally arising plane polarization is insufficient for the described purposes.

Amplitude variation in the manner described in conjunction with FIG. 1 may serve merely to adjust the level of the output or may serve to modulate the beam continuously. Several variations are possible. Solid state magnetic host materials have well-defined crystallographic directions coinciding with easy and hard directions of magnetization. By choosing the appropriate orientation, the device may be made to operate digitally. Taking as an example the YIG host of copending application Ser. No. 536,722, the easy directions are defined as [111]. For digital operation, the crystal may be oriented with one [111] direction normal to the beam and a second defining a desired resultant field direction $H_R$. This arrangement results in a well-defined $H_R$ direction such that the magnetization may be tilted in this direction by use of a range parallel field.

For analog operation, again using as an example the cubic YIG structure, the orientation may be such that a hard direction [100] defines a direction midway between the normally applied field and the resultant field. Since there is no distinct change in the magnitude of the required saturating field from the unmodulated field direction (normal) to whatever extreme direction is desired, the magnetization direction follows the magnitude of the parallel component of the applied field in a continuous fashion. It is apparent that various functions may be attained by appropriate arrangement of the crystallographic orientation and of the field direction.

It should be noted that description of the devices has been in terms of magnetization direction rather than applied field direction. In many instances there is a close correspondence between these B and H field directions. There are certain crystallographic orientations, however, which may permit a change in magnetization direction as required for certain of these devices without requiring a corresponding change in applied field direction. An exemplary device of this class may be described in terms of FIG. 1.

Assuming an orientation such that an easy direction of magnetization defines an acute angle with respect to the beam traversal direction, which latter in turn defines a magnetization direction requiring a larger applied field for saturation, it is possible, by applying a unidirectional field of varying amplitude, to shift the magnetization from the easy direction to the beam direction. Treating as an example the case of YIG, the required conditions may be met by an orientation such that a [111] direction defines an angle of something less than 35 degrees with respect to the beam direction, so that the other [111] axis defines an angle greater than 35 dgrees. Application of a field in the beam direction just sufficient to saturate the rod along the [111] axis may be accomplished at a first level of applied field. Increasing the magnitude of the applied field to a level sufficient to overcome the demagnetizing and anisotropy fields along the major axis of the rod shifts the magnetization direction. Accordingly, the degree of rotation or the Zeeman splitting may be changed. Other arrangements are apparent. It is recognized that the arrangements described in the preceding paragraph takes advantage of the anisotropy field(s) of the crystalline material. In certain instances, the magnetization, $4\pi M$, is substantially larger and a selectivity based on this anisotropy is impractical. In these instances, it is often possible to reduce the magnetization so as to emphasize the anisotropy. This is readily accomplished in YIG by compensation, as with gallium. By this means, it has been possible to reduce the magnetization from its usual value of the order of 2000 gauss to a value of about 200 gauss. By this means the anisotropy field may be increased by about tenfold.

The operation of the device of FIG. 1 has been described in terms of use of a saturating field which, in one illustrative embodiment, is normal to the beam direction. It is known, however, that there is a natural precessional resonance whose frequency increases with applied field above saturation. Use of a field merely sufficient to saturate imposes a frequency limit on the device, since the ability of the magnetization direction to follow the modulating or tilting field decreases as resonance is approached. For the exemplary case of YIG, this resonance becomes a significant limitation at frequencies of the order of tens of megacycles. It is clear that this limitation may be increased by increasing the magnitude of the "saturating" field, that is, the field corresponding to the unmodulated condition of the beam. By this means, effective modulation in a YIG host at approximately one kilomegacycle has been achieved. Of course, the greater the fixed field, the larger the required modulating field component to bring about a given amount of modulation, so that the fixed field is desirably kept as close to saturation as is permitted.

The arrangement of FIG. 1 may also be considered representative of a class of devices in which alteration of the laser beam is produced by altering the distance between the mirrored ends through the magnetostriction of the host. This embodiment, which is likely to take the form of tuning but which may well be adapted to a continuous modulation, again makes use of a saturating field which is tilted to the desired degree to compress or stretch the crystal the required amount in the direction of traversal. Since this is likely to be a near-static condition, it is possible that such an arrangement may utilize but a single applied field, which would then be in a direction $H_R$, as required. Such an adjustment, may be made manually, or may be part of a feedback circuit designed to maintain the laser at some desired operating condition. It may be utilized to make a small frequency adjustment or simply to optimize a desired mode. To secure the greatest latitude in adjustment through this mechanism, beam traversal is desirably in the direction permitting the greatest magnetostrictive change. In the YIG host, this consideration indicates beam traversal in the [111] crystallographic direction.

The Zeeman splitting which accompanies use of a saturating field may constitute a consideration in the design of apparatus operating on any of the principles discussed. Since this splitting is sensitive to the crystallographic direction of the magnetization, it follows that some frequency shift may result in certain of the described devices. This effect may be minimized, as by use of the digital arrangement in accordance with which the net field direction is in an equivalent easy magnetization direction in both positions. On the other hand, the frequency variation due to a change in Zeeman splitting may deliberately be maximized in accordance with some ancillary or prime objective to be served by one of the arrangements herein.

Figure 2:
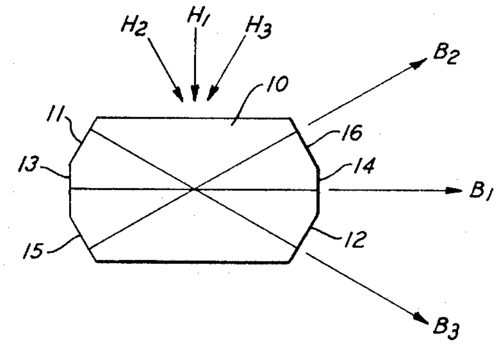
FIG. 2 is a plan view of a laser device in accordance with the invention with provision for deflecting or spatially modulating the direction in which the beam emerges.

The device of FIG. 2 consists of an active element 10 in common with the other devices of this application consisting of a crystalline magnetic host material containing an active ion provided with pump means not shown and also provided with means for impressing magnetic field/fields which may result in magnetic saturation in any of the directions designated by the vector quantities $H_1$, $H_2$, and $H_3$. Laser body 10 is provided with several pairs of parallel faces such as 11–12, 13–14, and 15–16, with one of each pair of faces, in this case 11, 13, and 15, being completely reflecting, and the other of each pair being partially reflecting (12, 14, and 16). Appropriate faces may also be provided with polarizing means as discussed. Under these circumstances, each pair of faces may define a possible oscillatory laser mode. With net magnetization in the direction $H_1$, laser action is between face 13 and 14, so resulting in emerging beam $B_1$. Switching the magnetization to position $H_2$ results in a component parallel to beam $B_1$, so introducing a degree of rotation in that beam and producing some cancellation, as described in conjunction with the device of FIG. 1. Under these circumstances, the mode defined in the direction $B_2$ becomes more efficient, since there is no component of magnetization in that direction, so that this beam defines the predominant mode, and the laser beam emerges in that direction. In the same fashion, tilting the field to direction $H_3$ results in emergence of the beam at $B_3$.

Again, variations in device design are suggested. With but the small number of deflection positions indicated in the exemplary device, it is possible to orient the crystal so that each field direction coincides with an easy direction of magnetizaton. Where a greater number of deflection positions is required so that a larger number of reflecting faces is provided, it will probably not be possible (depending on crystal symmetry) to have each field directon coincide with an easy direction, in which event orientation may desirably be such that the sector defined by the normal field direction and the most remote field direction includes a hard direction of magnetization.

Figure 3:
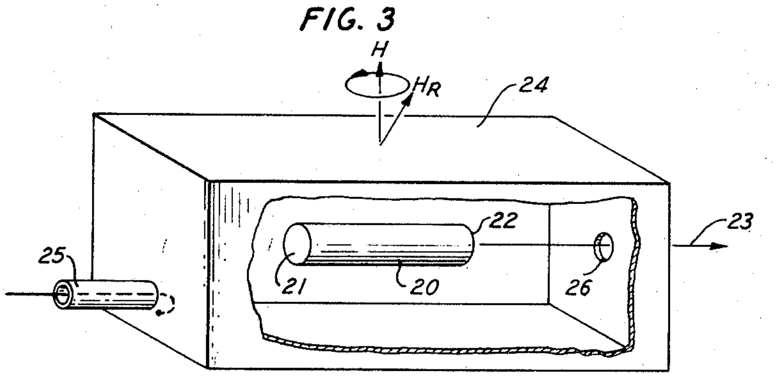
FIG. 3 is a schematic perspective representation partly in section of a laser so arranged as to operate under the influence of an applied radio frequency field.

The device of FIG. 3 is composed of a laser crystal 20, again with reflecting ends 21 and 22, the latter being only partially reflecting, so as to permit the emergence of laser beam 23. Also provided are a pump source, not shown, for producing a population inversion, a magnetic field at least sufficient to saturate body 20, having a direction of magnetizaton defined by vector H, and, optionally, plane polarizing means not shown. The laser is, in this embodiment, contained within a microwave cavity 24. In operation, field H is set at some value at or above saturation such as to result in a desired resonance frequency, at which frequency microwave energy is coupled to cavity 24 via coaxial probe 25. Microwave cavity 24 is provided with a port 26, through which the laser beam 23 emerges. This results in a precessional resonance denoted $H_R$, which, since it has a component of magnetization parallel with beam 23, results in an amplitude variation in the output in the manner described in FIG. 1. With H applied normal to the beam, the precession produces an amplitude variation on the beam at twice the microwave frequency. The modulation may be set at the fundamental applied frequency by canting the field H so that the precession is between a normal and an extreme position. Of course, it may be desirable to use a microwave structure for operation below resonance in the manner discussed in conjunction with FIG. 1.

A further species of the invention may utilize the configuration of FIG. 1 or FIG. 3. Here, the fact that the laser beam may be circularly polarized may be utilized to phase modulate the output. In this operation, the interaction of the normal saturating field such as $H_N$ in FIG. 1 and the horizontal or parallel field $H_P$, which may be at radio frequency, produces a velocity change for one circularly polarized component relative to the other. Selection of either component results in an effective change in the distance between the reflecting ends of the laser, so changing the phase of the output.

The illustrative embodiments represented by the figures are but a few of the useful devices taking advantage of the interaction of an applied magnetic field having a suitable canted direction and a laser beam within a saturable magnetic host. All such devices profit by the ability to change the direction of a very large internal magnetization by use of a relatively small external field. The devices of this invention all utilize a magnetization direction which is, at some time during operation, such as to have a component along a permitted laser mode direction, that is, a mode defined by a pair of reflecting ends. It has been seen that the canted field may be the resultant field produced by application of a fixed direction saturating field together with a smaller adjusting or modulating field. In this configuration, the fixed field is generally normal to the laser beam. It has been seen that the adjusting or modulating field may be D.C., or A.C. and that it may be introduced in a variety of ways. Other variations are apparent. The invention is considered to include all such arrangements in which the direction of a canted magnetization, as described, is determinative of a characteristic of the output upon which dependence is had for tuning or other variation. The appended claim is to be so construed.

What is claimed is:

1. Laser comprising a crystalline saturable magnetic host material provided with at least two faces for defining a laser beam resonator, first means for applying a magnetically saturating field to produce a magnetization direction having a component in the direction of a permitted laser beam, said first means consisting essentially of a first applied field substantially normal to a permitted laser beam having a magnitude sufficient to saturate the said material and a second field substantially parallel to a permitted laser beam, second means for varying the magnitude of said second field during operation so as to vary the net magnetization direction of the applied field within an arc of from 2° to 88° with respect to the said beam and together with a polarizer in the said resonator.

References Cited

UNITED STATES PATENTS

| | | | |
|---|---|---|---|
| 3,001,141 | 9/1961 | Fletcher et al. | 330—4 |
| 3,056,091 | 9/1962 | Seidel | 330—4 |
| 3,432,767 | 3/1969 | Pole et al. | 331—94.5 |
| 2,974,568 | 3/1961 | Dillon. | |
| 3,064,201 | 11/1962 | Damon | 331—94.5 X |
| 3,213,281 | 10/1965 | Nedderman | 331—94.5 X |
| 3,248,671 | 4/1966 | Dill et al. | 331—94.5 |
| 3,252,103 | 5/1966 | Geusic et al. | 331—94.5 X |
| 3,344,365 | 9/1967 | Lewis | 331—94.5 |

OTHER REFERENCES

Jenkins and White: "Magneto-Optics and Electro-Optics in Fundamentals of Optics," 3rd ed., McGraw-Hill (New York), 1957, pp. 588–599.

"Visual Observation of Magnetostatic Modes," J. Dillon, Jr. et ux., Appl. Phys. Ltrs., 2, 2, Jan. 15, 1963, pp. 38–39.

"Microwave Modulation of Light Using Ferrimagnetic Resonance," L. Anderson, J. Appl. Phys., 34, 4 (part 2), April 1963, pp. 1230–1.

(Other references on following page)

"Magnetooptical Properties of Rare-Earth Ions in Ferromagnetic Crystals," G. Krinchik, Soviet Phys.—Solid-State, 5, 2, August 1963, pp. 273–277.

"Ferromagnetic Resonance in Unsaturated Yttrium Garnet Single Crystals," Manuiloua et ux., Soviet Phys.—Solid-State, 6, 9, March 1965, pp. 2152–5.

"Magneto-Optical Variable Memory Based Upon the Properties of a Transparent Ferrimagnetic Garnet at Its Compensation Temperature," J. Chang et al., J. Appl. Phys., 36, 3 (two parts—part 2), March 1965, pp. 1110–1111.

"Wall Effects in Single-Crystal Spheres of Yttrium Iron Garnet (YIG)," S. Chiba, Appl. Phys. Ltrs., 5, 9, Nov. 1, 1964, pp. 176–178.

"Light Modulator," P. Albert et ux., IBM Tech. Discl. Bul., 8, July 2, 1965.

RONALD L. WIBERT, Primary Eraminer

R. J. WEBSTER, Assistant Examiner

U.S. Cl. X.R.

330—4; 350—151